United States Patent
Huang et al.

(10) Patent No.: US 12,099,598 B2
(45) Date of Patent: Sep. 24, 2024

(54) RISK CLASSIFICATION OF INFORMATION TECHNOLOGY CHANGE REQUESTS

(71) Applicant: MICRO FOCUS LLC, Santa Clara, CA (US)

(72) Inventors: Hao Huang, Shanghai (CN); Jin Wang, Shanghai (CN); Jan Steube, Hesse (DE); Nai-Long Wen, Shanghai (CN); Zhen Cui, Shanghai (CN)

(73) Assignee: Micro Focus LLC, Santa Clara, CA (US)

( * ) Notice: Subject to any disclaimer, the term of this patent is extended or adjusted under 35 U.S.C. 154(b) by 769 days.

(21) Appl. No.: 17/278,726

(22) PCT Filed: Sep. 30, 2018

(86) PCT No.: PCT/CN2018/109057
§ 371 (c)(1),
(2) Date: Mar. 23, 2021

(87) PCT Pub. No.: WO2020/062224
PCT Pub. Date: Apr. 2, 2020

(65) Prior Publication Data
US 2022/0035908 A1    Feb. 3, 2022

(51) Int. Cl.
*G06F 21/55*    (2013.01)
*G06Q 10/0637*    (2023.01)

(52) U.S. Cl.
CPC ....... *G06F 21/55* (2013.01); *G06Q 10/06375* (2013.01)

(58) Field of Classification Search
CPC .......................... G06F 21/55; G06Q 10/06375
(Continued)

(56) References Cited

U.S. PATENT DOCUMENTS

| 8,006,223 B2 | 8/2011 | Boulineau et al. |
| 8,156,063 B1 | 4/2012 | Rahm ouni |

(Continued)

FOREIGN PATENT DOCUMENTS

KR    101856543 B1    5/2018

OTHER PUBLICATIONS

Anderson, et. al., "Risk Classification of Medicare HMO Enrollee Cost Levels Using a Decision-Tree Approach", American Journal of Managed Care, vol. 10, No. 2, 2004 (Year: 2004).*

(Continued)

*Primary Examiner* — Tsu-Chang Lee
(74) *Attorney, Agent, or Firm* — Sheridan Ross P.C.

(57) ABSTRACT

A computing device includes a processor and a machine-readable storage medium storing instructions. The instructions are executable by the processor to: receive input data defining an information technology (IT) change request; in response to a receipt of the input data, perform a first risk classification of the IT change request using a decision tree model; generate a graphical user interface based on the first risk classification, the graphical user interface indicating risk impacts for each of a plurality of request features, and the graphical user interface including a graphic representation of the decision tree model; in response to a user modification to a first request feature of the plurality of request features in the graphical user interface, automatically perform a second request analysis using the decision tree model; and automatically update the graphical user interface based on the second request analysis.

20 Claims, 7 Drawing Sheets

(58) Field of Classification Search
USPC .......................................................... 706/12
See application file for complete search history.

(56) References Cited

U.S. PATENT DOCUMENTS

| | | |
|---|---|---|
| 8,380,838 B2 | 2/2013 | Bose et al. |
| 8,756,094 B2 | 6/2014 | Keinan |
| 9,734,447 B1 | 8/2017 | Diev et al. |
| 2010/0191952 A1 | 7/2010 | Keinan |
| 2011/0099050 A1 | 4/2011 | Coldicott |
| 2016/0022193 A1* | 1/2016 | Rau ..................... A61B 5/4884 |
| | | 600/595 |

OTHER PUBLICATIONS

International Search Report and Written Opinion prepared by the ISA/CN on Jun. 27, 2019, for International Application No. PCT/CN2018/109057.

Wickboldt et al. "A Solution to Support Risk Analysis On IT Change Management," 2009 IFIP/IEEE International Symposium on Integrated Network Management, IEEE, 2009, pp. 445-452.

BMC Remedy IT Service Management 7.5.00-Configuration Guide, BMC Software, Inc., Jan. 2009, 544 pages.

International Search Report / Written Opinion; PCT/CN2018/109057; Mailed Jul. 9, 2019; 9 pages.

Soraic, "IT Service Management Made Smarter with Machine Learning," ITSM.TOOLS, Feb. 1, 2018, 8 pages.

Roberts "ITSM and Artificial Intelligence Part 2—Machine Learning," iCore Ltd., Jun. 14, 2017, 6 pages.

* cited by examiner

RISK CLASSIFICATION OF INFORMATION TECHNOLOGY CHANGE REQUESTS

CROSS-REFERENCE TO RELATED APPLICATIONS

This application is a national stage application under 35 U.S.C. 371 and claims the benefit of PCT Application No. PCT/CN2018/109057 having an international filing date of 30 Sep. 2018, which designated the United States, the entire contents of which are incorporated herein by reference.

BACKGROUND

An individual or organization may receive requests to modify an existing computing system. For example, a support group may receive change requests to modify an information technology (IT) infrastructure. The modifications to the IT infrastructure may include adding or removing hardware components, adding or removing software applications, and so forth.

BRIEF DESCRIPTION OF THE DRAWINGS

Some implementations are described with respect to the following figures.

DETAILED DESCRIPTION

A change management system may be a computer-based system to submit and manage information technology (IT) change requests. As used herein, the term "IT change request" refers to a request to modify an IT infrastructure. For example, a user (e.g., an analyst, a process owner, a client, etc.) may use the change management system to request the addition or removal of hardware and/or software components, the modification of access permissions, the modification of hardware and/or software settings, and so forth. However, the user submitting the IT change request may be unable to evaluate the risk associated with the IT change request. For example, the user may lack the experience or specialized knowledge to determine the likelihood that the requested IT change may cause system downtime, may impact customer service agreements, and so forth. This problem is more likely to be present when the change relates to new IT technology. Accordingly, the IT change request may be created and submitted without awareness of its associated risk.

In accordance with some implementations, examples are provided for generating a graphical user interface to create IT change requests with risk awareness. As described further below with reference to FIGS. 1-6, some implementations include training a decision tree model using historical data regarding IT change requests. A risk classification of a new IT change request may be performed using the trained decision tree model. A graphical user interface may be generated based on the risk classification, and may allow a user to evaluate risk impacts for various request features. The graphical user interface may allow the user to interactively modify the request features. In response to the user modification, a new risk classification may be automatically performed using the trained decision tree model, and the graphical user interface may be updated based on the new risk classification. Accordingly, the graphical user interface may use the trained decision tree model to allow the user to modify the change request and view the risk effect of the modifications. In this manner, the graphical user interface may be improved by providing interactive modification and risk information of IT change requests. Once the modifications are completed, the user may use the graphical user interface to cause automatic completing of the IT change request.

Figure 1:
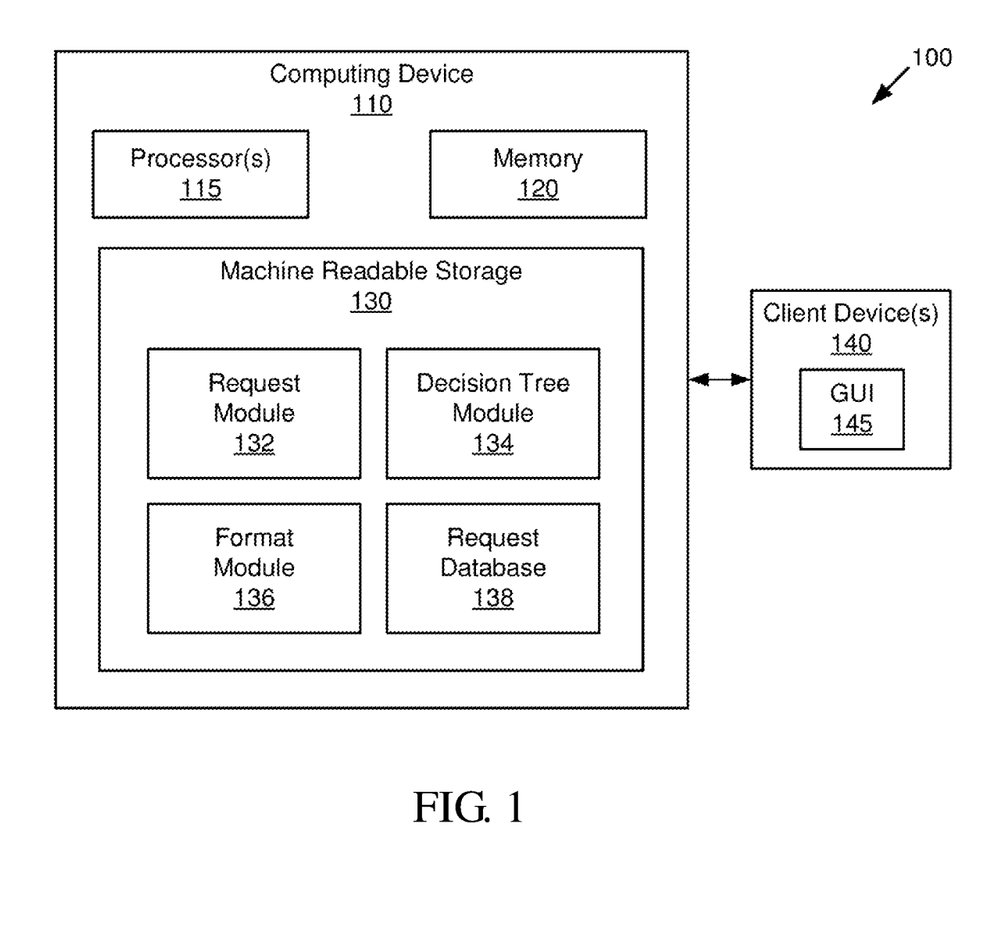
FIG. 1 is a schematic diagram of an example system, in accordance with some implementations.

FIG. 1 is a schematic diagram of an example system 100, in accordance with some implementations. In some examples, the system 100 may include a computing device 110 and client device(s) 140. The computing device 110 may be, for example, a computer, a portable device, a server, a network device, a communication device, etc. Further, the computing device 110 may be any grouping of related or interconnected devices, such as a blade server, a computing cluster, and the like. Furthermore, in some implementations, the computing device 110 may be a specialized device or appliance.

In some implementations, the computing device 110 may provide functionality to allow a user to create and/or modify IT change requests. For example, the computing device 110 may be all or part of an IT change management system. In another example, the computing device 110 may be an interface or gateway to any number of IT change management systems (not shown in FIG. 1).

In some implementations, the computing device 110 can interface with client device(s) 140, and enable a user (not shown in FIG. 1) of the client device 140 to create and/or modify IT change requests. For example, the client device(s) 140 may include a remote terminal or computer that is connected to the computing device via a wired or wireless network. In other examples, the client device 140 may comprise a display screen coupled to (or included in) the computing device 110. As shown, in some implementations, the client device 140 may display a graphical user interface (GUI) 145 that allows the user to specify attributes of the IT change request (e.g., due date, priority, instructions, location, etc.).

As shown, the computing device 110 can include processor(s) 115, memory 120, and machine-readable storage 130. The processor(s) 115 can include a microprocessor, microcontroller, processor module or subsystem, programmable integrated circuit, programmable gate array, multiple processors, a microprocessor including multiple processing cores, or another control or computing device. The memory 120 can be any type of computer memory (e.g., dynamic random access memory (DRAM), static random-access memory (SRAM), etc.). In some implementations, the machine-readable storage 130 can include non-transitory storage media such as hard drives, flash storage, optical disks, etc. As shown, the machine-readable storage 130 can include a request module 132, a decision tree module 134, a format module 136, and a request database 138.

As shown in FIG. 1, in some implementations, the request module 132, the decision tree module 134, and/or the format module 136 may be implemented as instructions stored in the machine-readable storage 130. However, the request module 132, the decision tree module 134, and/or the format module 136 can be implemented in any suitable manner. For example, some or all of the request module 132, the decision tree module 134, and/or the format module 136 could be hard-coded as circuitry included in the processor(s) 115 and/or the computing device 110. In other examples, some or all of the request module 132, the decision tree module 134, and/or the format module 136 could be implemented on a remote computer (not shown), as web services, and so forth. In another example, the request module 132, the decision tree module 134, and/or the format module 136 may be implemented in one or more controllers of the computing device 110.

In some implementations, the request database 138 may include information regarding change requests. For example, the request database 138 may store records regarding completed and open change requests for an IT infrastructure. In some implementations, each record of the request database 138 may include a set of attribute values associated with a unique change request. For example, each record may include values for attributes such as change type, due date, priority code, system identifier, component identifier, device identifier, software identifier, change instructions, user identifier, memory allocation, account code, bandwidth limit, storage capacity, revision code, user comments, level of business impact, requested completion date/time, Service Level Agreement (SLA), title of the requesting user, date/time received, and so forth. As used herein, "request features" refers to attribute values of a change request.

In some implementations, the request database 138 may indicate whether an IT change request was successfully completed according to specified criteria (e.g., on time, on budget, without causing system downtime, without violating SLA requirements, etc.). In some implementations, the request database 138 may be populated from request data included in one or more change management systems (not shown in FIG. 1). In such implementations, the format module 136 may convert data in one or more formats used by the change management systems to a single format used by the request database 138.

In some implementations, the request database 138 may include scores indicating the risks associated with completed IT change requests. Such scores may be automatically generated by the request module 132 based on whether specified criteria were satisfied by the completed IT change requests. In some examples, such scores may be manually generated by subject-matter experts based on review of the completed IT change requests.

In some implementations, the decision tree module 134 may use a training data set to generate or train a decision tree model. For example, the training data may include a set of request features of all or a portion of the historical request data in the request database 138. A decision tree model is a machine learning classification model that is arranged in a node tree structure. The decision tree module 134 may train the decision tree model by recursively partitioning the training data based on the historical request data. Each leaf node of the tree represents a class label of data elements. Each non-leaf node of the tree represents an attribute test that splits the data elements into separate partitions. In some implementations, the decision tree module 134 may choose each non-leaf node by selecting the best split from a set of possible splits to maximize the information gain at that node of the tree. In some examples, a non-leaf node of the tree may correspond to a binary test (e.g., "yes" or "no," "true" or "false," etc.) of a particular request feature of the historical request data.

In some implementations, the request module 132 may receive or detect a new IT change request. For example, the request module 132 may receive an indication of a new IT change request created by a user interacting with the GUI 145. In response to the new IT change request, the request module 132 may perform or initiate a risk classification of the change request using the decision tree model (e.g., provided by the decision tree module 134). As used herein, "risk classification" refers to traversing a trained decision tree model to determine the risk associated with a change request. In some implementations, the decision tree model may be traversed by comparing the request features of the received IT change request to the attribute tests represented by the non-leaf nodes of the decision tree model. Further, in some implementations, the destination node (i.e., the leaf node that is reached by traversing the decision tree model) may indicate a risk score for the received IT change request. The risk score may be represented as a category (e.g., high, medium, low), a number (e.g., 0.8, 0.5, etc.), or in any other form.

In some implementations, the request module 132 may generate a graphical user interface based on the risk classification. For example, the graphical user interface may include a graphic representation of the decision tree model (e.g., as a tree including nodes and connectors), and may indicate the traversal path from a root node to the destination node. In some examples, the traversal path may be indicated by graphic symbol(s) or characteristic(s) (e.g., color-coding, highlighting, line characteristics, text labels, animation, etc.) displayed with the nodes and/or connectors along the path.

In some implementations, the user interface may include a listing of the request features that are shown separately (e.g., in a different portion of an interface screen) from the graphic display of the decision tree model. Further, in some implementations, the listing of the request features may indicate the risk impact of each request feature. For example, each request feature may be shown with a value indicating the proportion of the overall risk that is attributable to that particular request feature (e.g., a percentage contribution to the overall risk score of the change request).

In some implementations, the request module 132 may determine a set of optional modifications based on the risk classification, and may present the optional modifications in the user interface. For example, the request module 132 may determine that a particular feature has the highest risk impact, and may suggest a modification that reduces the risk impact of that particular feature. Such modifications may be presented as suggestions to the user, and may indicate the potential risk reduction of each modification. Further, the request module 132 may receive a user selection of a particular modification, and in response may modify the features of the change request. In some examples, the request module 132 may include a set of predefined rules to determine modifications that can be suggested to the user. Such rules may be specified by human experts in a particular IT field related to the IT change request.

In some implementations, the user interface may include interactive controls or inputs to allow the user to modify the features of the new IT change request. For example, the request module 132 may present buttons, sliders, text boxes, and/or other elements to adjust request features (e.g., priority, due date, etc.). In response to such user modifications, the request module 132 may perform an updated risk classification. Further, the request module 132 may generate an updated user interface based on the updated risk classification.

In some implementations, the user interface may allow the user to submit the IT change request for completion. For example, once the user has adjusted request features to reduce the risk associated with the IT change request, the user may finalize the IT change request, and thereby cause the IT change request to be executed. In some implementations, the IT change request may be automatically executed by the request module 132 based on the user modifications. For example, if the user has specified additional testing for the IT change request, the request module 132 may automatically perform any required actions for the request, including the additional testing. After the IT change request is completed, the request module 132 may change a status of the IT change request to "closed" or "completed." Further, in some examples, the completed request may be added to the request database 138.

Figure 2:
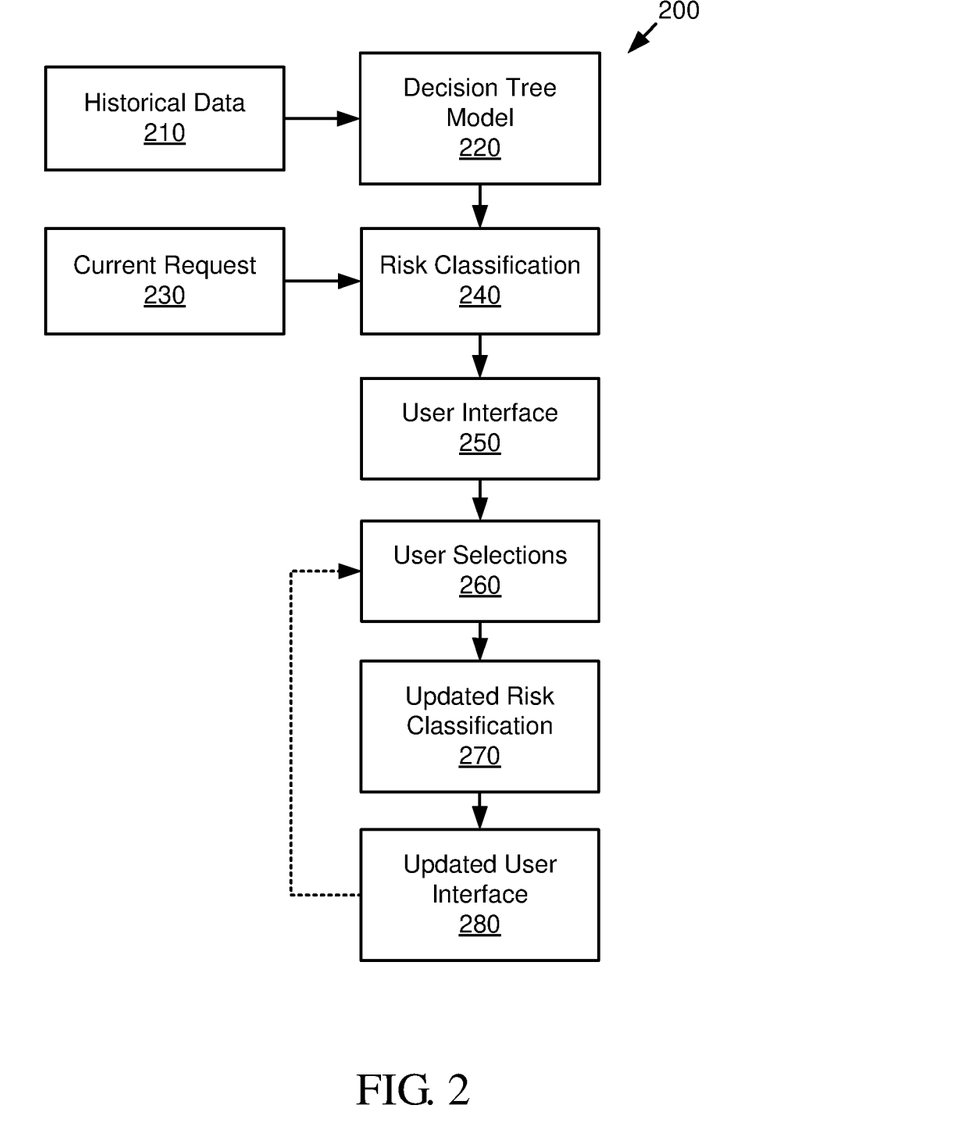
FIG. 2 is an illustration of an example operation in accordance with to some implementations.

Referring now to FIG. 2, shown is an illustration of an example operation 200 in accordance with to some implementations. As shown, the historical data 210 may be used to automatically generate or train a decision tree model 220. In some examples, the historical data 210 may be all or a portion of the historical request data in the request database 138 (shown in FIG. 1). A risk classification 240 may be performed by using a current request 230 to traverse the decision tree model 220. For example, the request module 132 (shown in FIG. 1) may compare the request features of the current request 230 to attribute tests represented by non-leaf nodes of the decision tree model 220.

In one or more implementations, a user interface 250 may be generated based on the risk classification 240. For example, the user interface 250 may include an overall risk score for the current request 230, a graphical representation of the decision tree model 220 with a traversal path, a listing of request features and associated risk impacts, a set of optional modifications, and other information related to the risk classification and/or the current request 230.

In some implementations, a user may interact with the user interface 250 to make user selections 260. For example, the user may modify a feature of the current request 230 by adjusting a control element in the user interface 250. In another example, the user may select an optional modification displayed in the user interface 250.

In some implementations, an updated risk classification 270 may be performed based on the user selections 260. For example, the request module 132 (shown in FIG. 1) may traverse the decision tree model 220 based on the request features as modified by the user selections 260. An updated user interface 280 may be generated based on the updated risk classification 270. Further, as indicated in FIG. 2 by a dotted arrow, the user can optionally make further user selections 260 in the updated user interface 280 over multiple iterations, and view the results of each modification in the updated user interface 280. In this manner, the user can interactively adjust various aspects of the current request 230 to attempt to reduce the risk associated with completing the current request 230. Once the user is satisfied with the risk classification, the modified change request can be completed. In some examples, one or more changes may be automatically performed to complete the modified change request. For example, the request module 132 (shown in FIG. 1) may perform a hardware modification to an IT system, a software modification to the IT system, or a combination thereof.

Figure 3A:
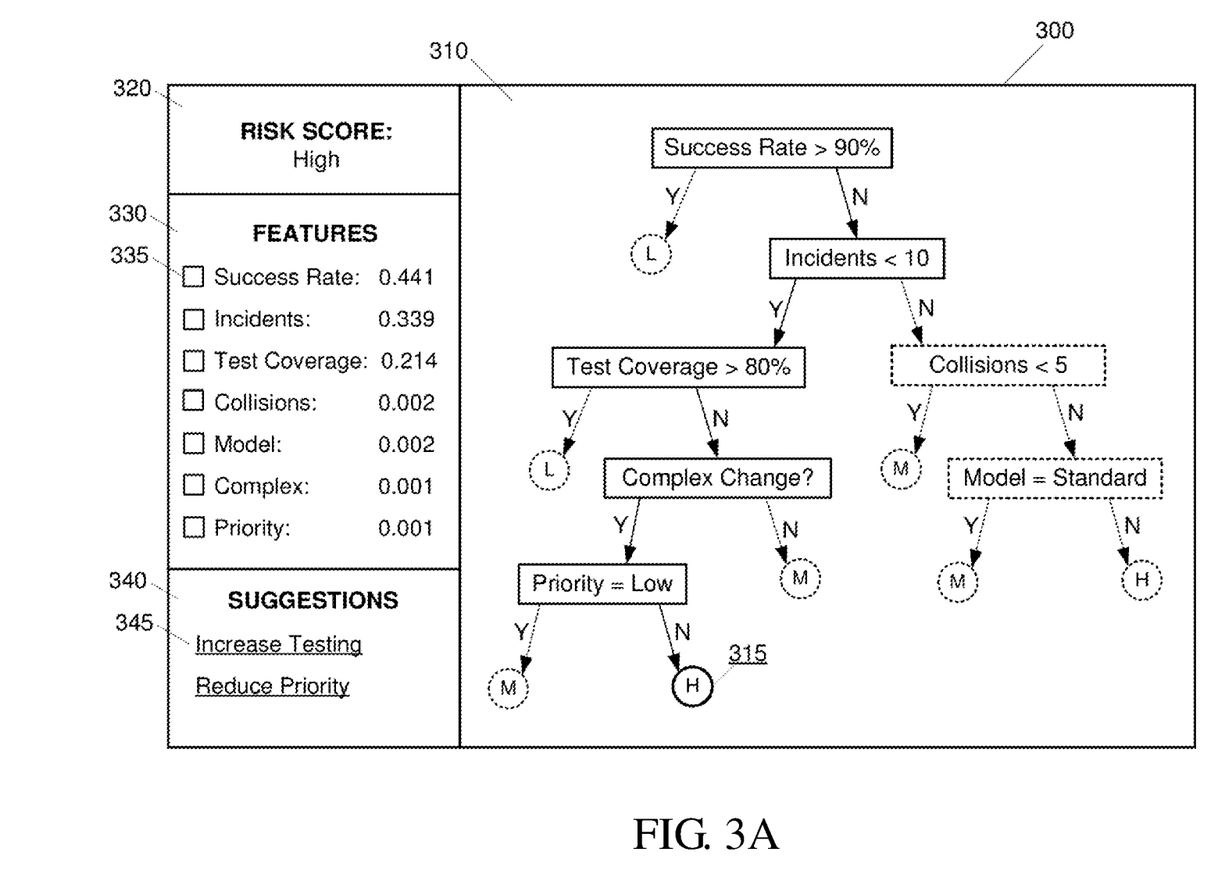
FIGS. 3A-3B are illustrations of an example user interface in accordance with some implementations.
Figure 3B:
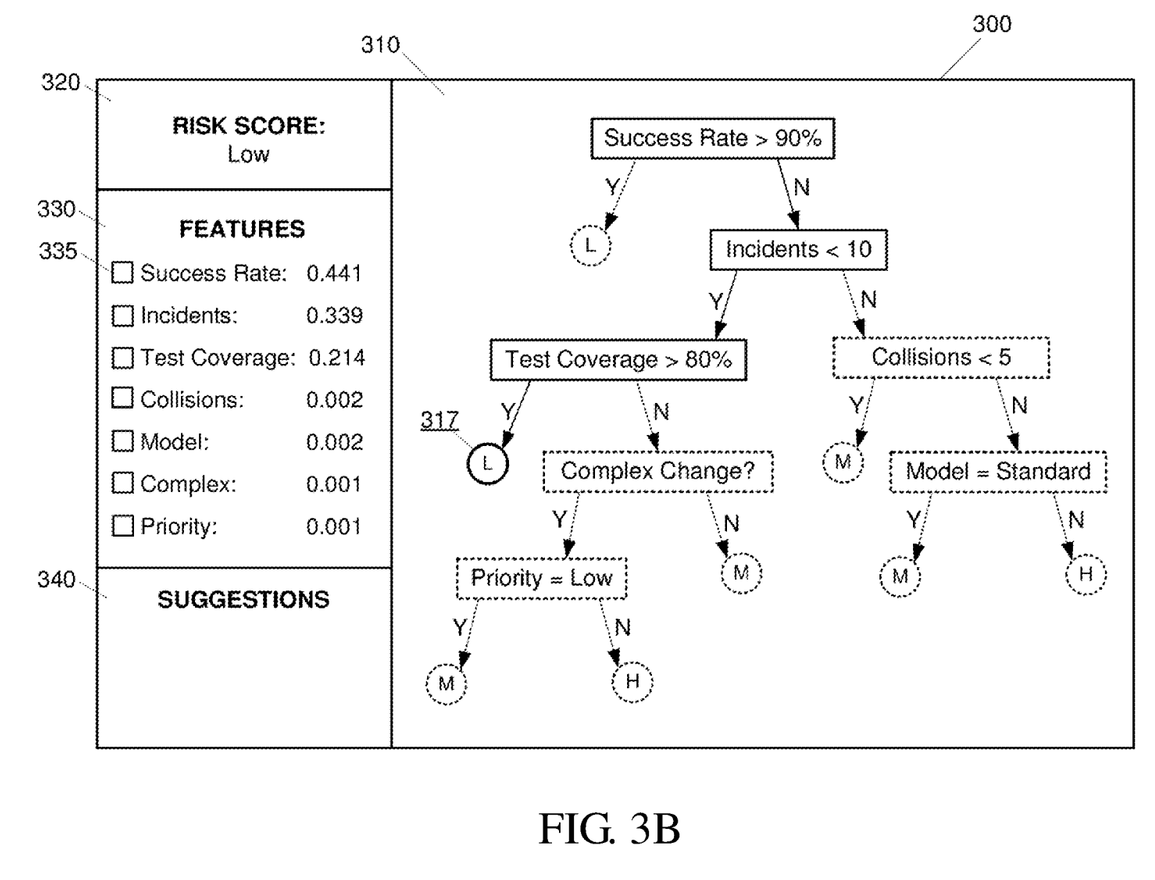

Referring now to FIGS. 3A-3B, shown are illustrations of an example user interface 300 in accordance with some implementations. As shown in FIG. 3A, the user interface 300 may include various separate interface portions, including a decision tree portion 310, a risk score portion 320, a feature list portion 330, and a suggestions portion 340. Assume that the user interface 300 is generated to display result of a risk classification of an input IT change request (e.g., current request 230 shown in FIG. 2). In some examples, the user interface 300 may be generated by the request module 132 and/or the decision tree module 134 (shown in FIG. 1). Further, in some examples, the user interface 300 may be displayed in a display device or client device (e.g., GUI 145 shown in FIG. 1).

In some examples, the decision tree portion 310 may include a representation of a decision tree model used to perform a risk classification of the input IT change request. In the example of FIG. 3A, the leaf nodes are circles including the letters "L," "M," and H," which respectively correspond to "low risk," "medium risk," and "high risk" labels. Further, in this example, the nodes and connectors in the traversal path to the destination node 315 are shown with solid lines, and the nodes and connectors that were not traversed are shown with dotted lines. Note that the destination node 315 is labeled "H," thereby indicating a "high risk" label. Stated differently, in the example of FIG. 3A, the risk classification has determined that completing the input request is associated with a high risk. Accordingly, the risk score portion 320 indicates that the overall risk score of the input request is "High."

In some implementations, the feature list portion 330 may include a listing of the request features evaluated in the risk classification. As shown, the feature list portion 330 may also include numerical values indicating the risk impact of each request feature. Further, the feature list portion 330 may include a control 335 for each request feature. In some examples, the control 335 may be selected to allow the user to manually modify the values associated with a particular request feature. In response to a user modification to the request features in the feature list portion 330, the underlying risk classification may be updated according to the user modification. Further, as discussed below with reference to FIG. 3B, the user interface 300 may be automatically updated to reflect the updated risk classification.

In some examples, each control 335 may be selected to cause display of an additional control or interface (e.g., a pop-up menu, a dialog box, slider, button, etc.) that allows the user to modify a value for an associated request feature (e.g., to modify the level of test coverage). In other examples, the controls 335 may be used to manually add or remove request features from the decision tree model. Further, adding and/or removing request features may cause the decision tree model to be automatically re-trained according to the new set of request features. In still other examples, the controls 335 associated with each request feature may include a first control to modify a value of the feature and a second control to add/remove the feature.

In some implementations, the suggestions portion 340 may include indications of suggested modifications to the request features. For example, the request module 132 (shown in FIG. 1) may determine a set of optional modifications based on the risk classification, and may present the optional modifications in the suggestions portion 340. In the example of FIG. 3A, each suggestion is shown as a hyperlinked text phrase indicating the suggested action (e.g., "increase testing," "reduce priority," and so forth), where clicking on the hyperlinked text phrase (e.g., with a mouse click) may cause the recommended action to be completed. However, other implementations are possible. For example, each suggestion could be displayed as a control element and an associated text label (e.g., a button in alignment with a text label), where activating the control element causes the recommended action to be completed.

In some implementations, the user interface 300 may be automatically updated to a modification to a request feature and/or a selection of a suggestion. Referring now to FIG. 3B, shown is an updated user interface 305 in accordance with one or more implementations. Assume that the updated user interface 305 is generated in response to a user selecting the "increase testing" suggestion in the suggestions portion 340 of FIG. 3A, or in response to a user modification to the "test coverage" feature in the feature list portion 330 of FIG. 3A. Note that, in FIG. 3B, the decision tree portion 310 shows a modified traversal path that ends at destination node 317, which is labeled "L." Further, the risk score portion 320 may indicate that the overall risk score has been changed to "Low," and the risk impacts of each feature may be updated in the feature list portion 330. Stated differently, the updated user interface 305 indicates that the user modification to the test coverage feature has changed the risk classification of the change request, and has thereby reduced the expected risk associated with completing the change request.

In some implementations, the updated user interface 305 may be shown temporarily when user places a cursor over a suggestion in the suggestions portion 340 without clicking. For example, if the user moves the mouse cursor over the suggestion "increase testing" without clicking (i.e., "hovering" the cursor over the suggestion), the other portions of the user interface 300 may be updated to shown the results of the suggestion only during the time that the cursor is over the suggestion. In this manner, the user may evaluate the effects of various suggestions without actually executing any of the suggestions.

Note that, while FIGS. 1-3B show example implementations, other implementations are possible. For example, it is contemplated that the functionality of the client device 140 may be included in the computing device 110. In another example, it is contemplated that any of the components of the client device 140 and/or the computing device 110 may be combined. In yet another example, it is contemplated that the client device 140 and/or the computing device 110 may include additional components. In still another example, it is contemplated that the user interface 300 may include additional elements, fewer elements, a different arrangement of elements, and so forth. In a further example, it is contemplated that the request database 138 may be implemented in one or more change management systems (not shown in FIG. 1) that are external to the computing device 110. Other combinations and/or variations are also possible.

Figure 4:
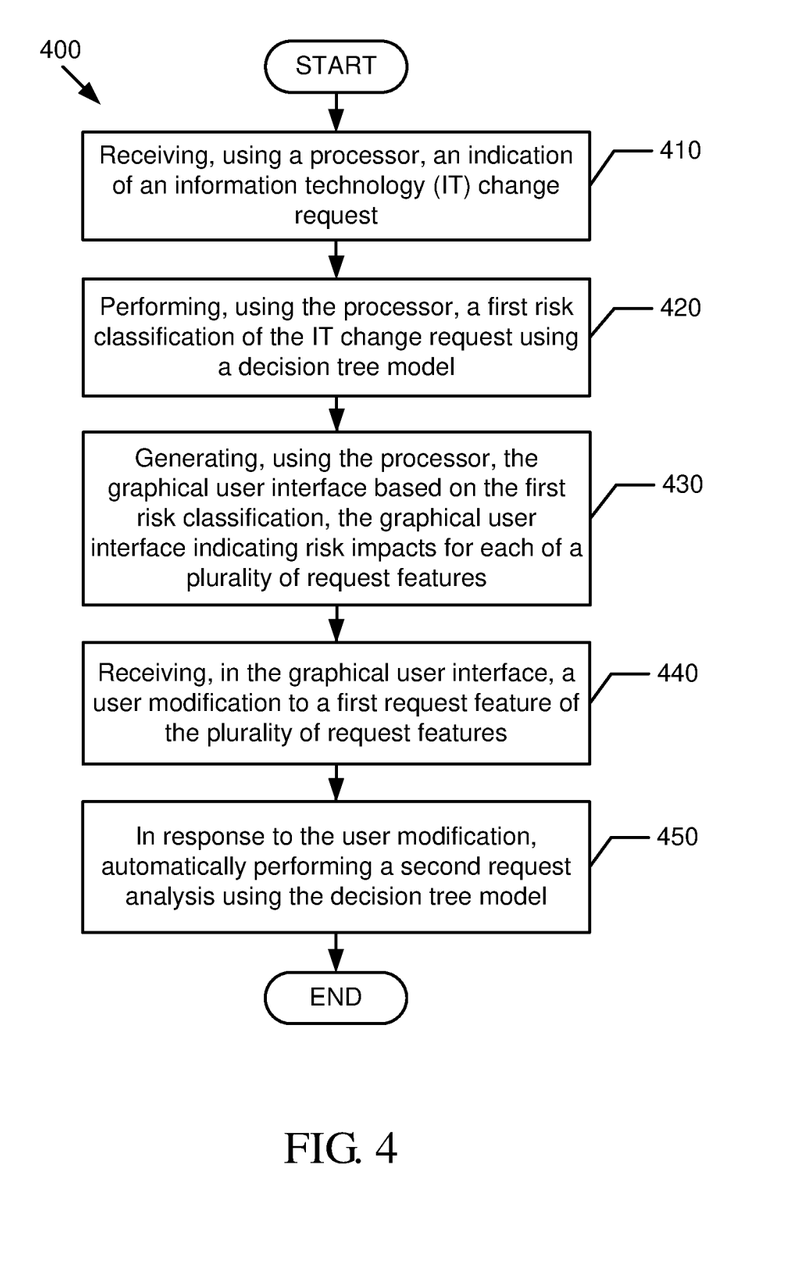
FIG. 4 is a flow diagram of an example process for generating a graphical user interface in accordance with some implementations.

Referring now to FIG. 4, shown is an example process 400 for generating a graphical user interface, in accordance with some implementations. The process 400 may be performed by the system 100 shown in FIG. 1. The process 400 may be implemented in hardware or machine-readable instructions (e.g., software and/or firmware). The machine-readable instructions are stored in a non-transitory computer readable medium, such as an optical, semiconductor, or magnetic storage device. For the sake of illustration, details of the process 400 may be described below with reference to FIGS. 1-3B, which show examples in accordance with some implementations. However, other implementations are also possible.

Block 410 may include receiving, using a processor, an indication of an information technology (IT) change request.

Block 420 may include performing, using the processor, a first risk classification of the IT change request using a decision tree model. For example, referring to FIGS. 1-2, the request module 132 may receive or detect the current request 230 (e.g., a new IT change request), and in response may perform the risk classification 240 using the decision tree model 220. In some implementations, the decision tree module 134 may generate the decision tree model 220 based on historical request data (e.g., from request database 138).

Block 430 may include generating, using the processor, the graphical user interface based on the first risk classification. The graphical user interface may indicate risk impacts for each of a plurality of request features. For example, referring to FIGS. 1 and 3A, the request module 132 may generate the user interface 300 based on a first risk classification of the IT change request. As shown in FIG. 3A, the user interface 300 may include a feature list portion 330 that lists the request features and their associated risk impacts.

Block 440 may include receiving, in the graphical user interface, a user modification to a first request feature of the plurality of request features. Block 450 may include in response to the user modification, automatically performing a second request analysis using the decision tree model. For example, referring to FIGS. 1 and 3A, the request module 132 may detect a user modification to the request features in the feature list portion 330 (e.g., using control 335). In response to this detection, the request module 132 may update the risk classification according to the user modification, and may update the user interface 300 to reflect the updated risk classification. After block 450, the process 400 is completed.

Figure 5:
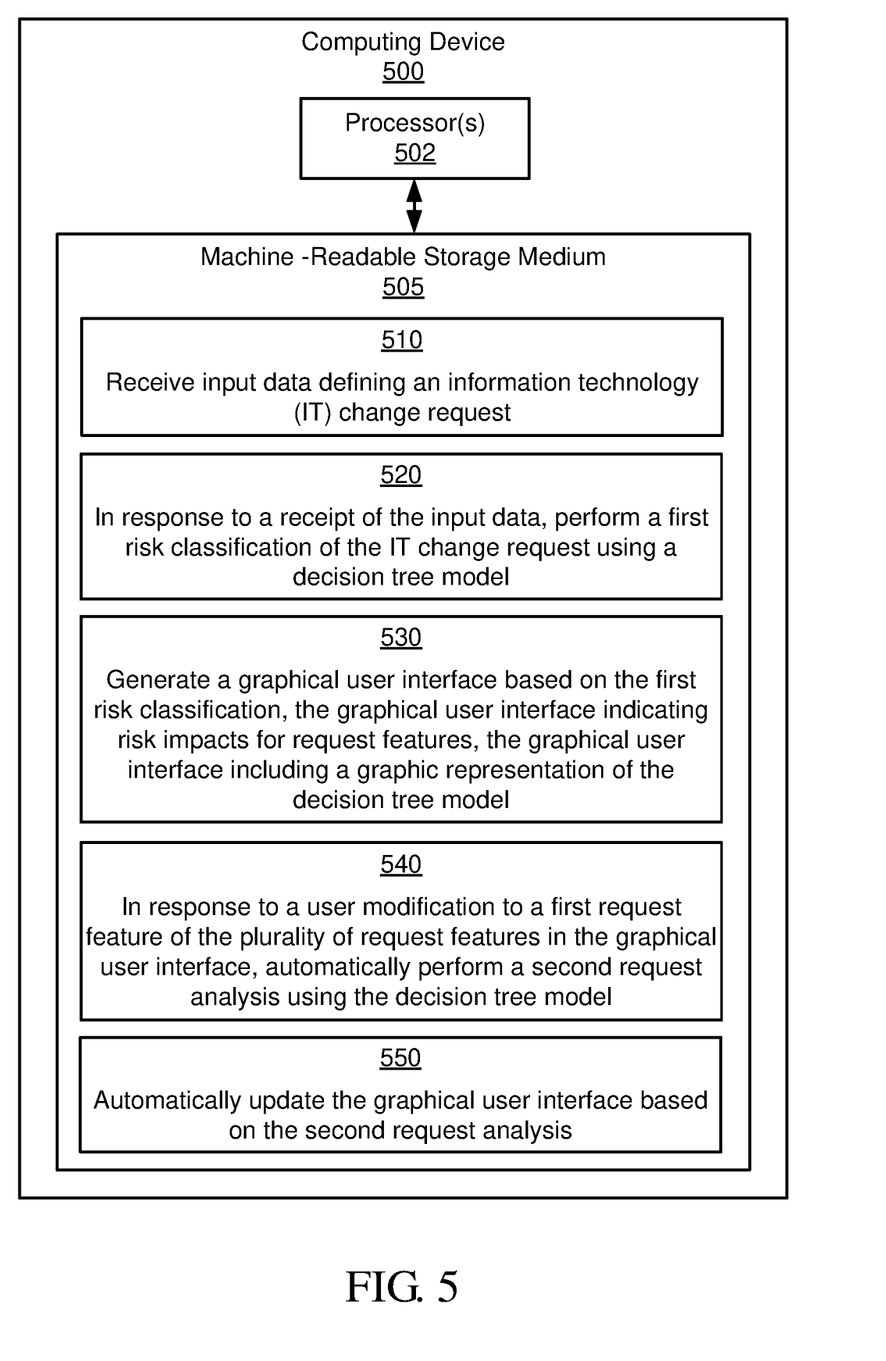
FIG. 5 is a schematic diagram of an example computing device in accordance with some implementations.

Referring now to FIG. 5, shown is a schematic diagram of an example computing device 500. In some examples, the computing device 500 may correspond generally to the computing device 110 shown in FIG. 1. As shown, the computing device 500 may include a hardware processor(s) 502 and machine-readable storage medium 505. The machine-readable storage medium 505 may be a non-transitory medium, and may store instructions 510-550. The instructions 510-550 can be executed by the hardware processor(s) 502.

Instruction 510 may be executed to receive input data defining an information technology (IT) change request. Instruction 520 may be executed to, in response to a receipt of the input data, perform a first risk classification of the IT change request using a decision tree model. For example, referring to FIGS. 1-2, the request module 132 may receive the current request 230, and in response may perform the risk classification 240 using the decision tree model 220.

Instruction 530 may be executed to generate a graphical user interface based on the first risk classification. The graphical user interface may indicate risk impacts for each of a plurality of request features. The graphical user interface may include a graphic representation of the decision tree model. For example, referring to FIGS. 1 and 3A, the request module 132 may generate the user interface 300 including a decision tree portion 310 and a feature list portion 330. The decision tree portion 310 may show the decision tree model with an indication of the traversal path to the destination node 315. The feature list portion 330 may list the request features and their associated risk impacts.

Instruction 530 may be executed to, in response to a user modification to a first request feature of the plurality of request features in the graphical user interface, automatically perform a second request analysis using the decision tree model. Instruction 540 may be executed to automatically update the graphical user interface based on the second request analysis. For example, referring to FIGS. 1 and 3A, the request module 132 may detect a user modification to the request features in the feature list portion 330, and in response may update the risk classification according to the user modification. The request module 132 may then update the user interface 300 to reflect the updated risk classification.

Figure 6:
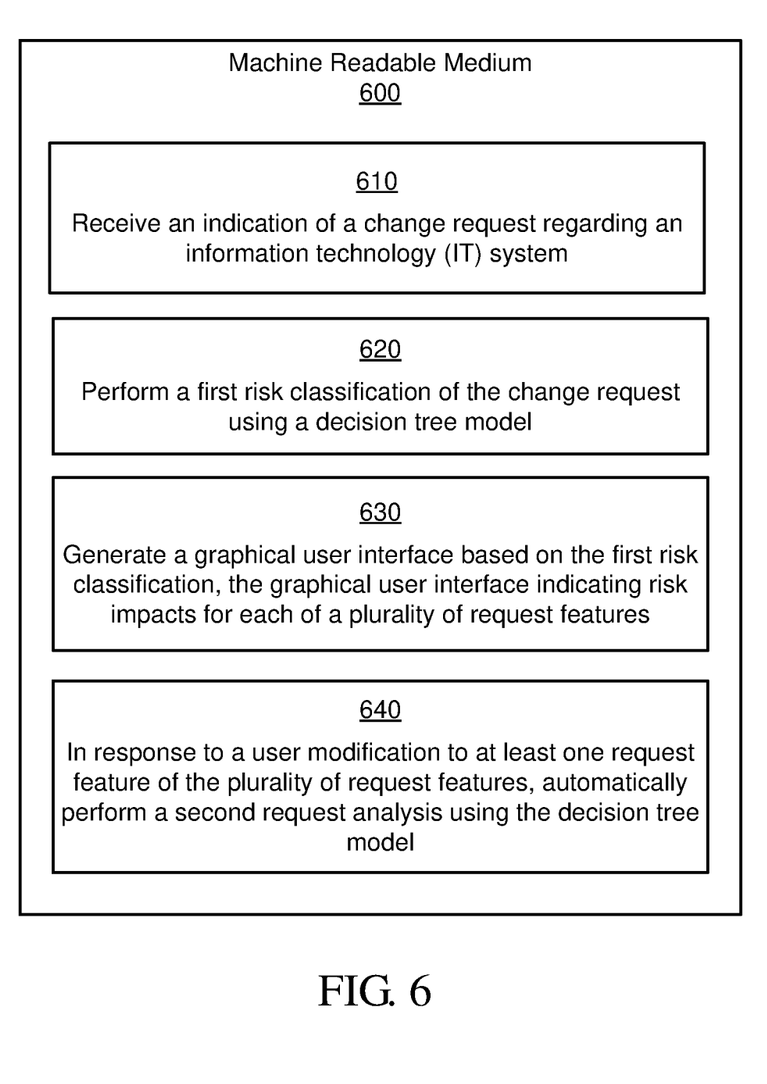
FIG. 6 is an illustration of an example machine-readable storage medium storing instructions in accordance with some implementations.

Referring now to FIG. 6, shown is a machine-readable storage medium 600 storing instructions 610-660, in accordance with some implementations. The instructions 610-660 can be executed by any number of processors (e.g., the processor(s) 115 shown in FIG. 1). The machine-readable storage medium 600 may be any non-transitory computer readable medium, such as an optical, semiconductor, or magnetic storage device.

Instruction 610 may be executed to receive an indication of a change request regarding an information technology (IT) system. Instruction 620 may be executed to perform a first risk classification of the change request using a decision tree model. Instruction 630 may be executed to generate a graphical user interface based on the first risk classification, the graphical user interface indicating risk impacts for each of a plurality of request features. Instruction 640 may be executed to, in response to a user modification to at least one request feature of the plurality of request features, automatically perform a second request analysis using the decision tree model.

In accordance with some implementations, examples are provided for generating a graphical user interface to create IT change requests with risk awareness. Some implementations include training a decision tree model using historical request data, and performing a risk classification of a new IT change request using the trained decision tree model. The risk classification may be used to generate a graphical user interface that allows a user to evaluate risk impacts for the request features. The graphical user interface may allow the user to interactively modify the request features. In response to the user modification, a new risk classification may be automatically performed using the trained decision tree model, and the graphical user interface is updated to reflect the new risk classification. Accordingly, the graphical user interface may interact with the trained decision tree model to allow the user to modify the change request and view the effect of the modifications on the overall risk of the change request. In some implementations, the graphical user interface may improve the computerized change management system by providing interactive risk information and modification of IT change requests.

Data and instructions are stored in respective storage devices, which are implemented as one or multiple computer-readable or machine-readable storage media. The storage media include different forms of non-transitory memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices.

Note that the instructions discussed above can be provided on one computer-readable or machine-readable storage medium, or can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

The invention claimed is:

1. A computing device comprising:
a hardware processor; and
a machine-readable storage medium storing instructions, the instructions being executable by the hardware processor to:
receive input data defining an information technology (IT) change request;
in response to a receipt of the input data, perform a first risk classification of the IT change request using a decision tree model;
generate a graphical user interface based on the first risk classification, the graphical user interface indicating risk impacts for each of a plurality of request features, and the graphical user interface including a graphic representation of the decision tree model;
in response to a user modification to a first request feature of the plurality of request features in the graphical user interface, automatically perform a second request analysis using the decision tree model; and
automatically update the graphical user interface based on the second request analysis.

2. The computing device of claim 1, wherein the instructions are executable by the hardware processor to:
generate the decision tree model using historical request information from a request database.

3. The computing device of claim 2, wherein the instructions are executable by the hardware processor to:
prior to a generation of the decision tree model:
obtain a plurality of request data files from a plurality of change management systems, each of the plurality of request data files having a unique data format; and
reformat the plurality of request data files into a single data format used by the request database.

4. The computing device of claim 1, wherein the graphical user interface includes:
indications of suggested actions to reduce an overall risk score of the IT change request; and
an overall risk score of the IT change request.

5. The computing device of claim 4, wherein:
the graphical user interface simultaneously includes a first portion, a second portion, a third portion, and fourth portion;
the first risk classification impacts of the plurality of request features are included in the first portion;
the graphic representation of the decision tree model is included in the second portion;
the indications of suggested actions are included in the third portion; and
the overall risk score is included in the fourth portion.

6. The computing device of claim 4, wherein the instructions are executable by the hardware processor to:
in response to a detection of a cursor placed over an indication of a first suggested action without clicking, temporarily update the graphical user interface to reflect results of completing the first suggested action only while the cursor remains over the indication of the first suggested action.

7. The computing device of claim 1, wherein the instructions are executable by the hardware processor to:
perform the first risk classification by traversing the decision tree model, wherein non-leaf nodes of the decision tree model correspond to attribute tests, and wherein leaf nodes of the decision tree model correspond to risk class labels.

8. A method for generating a graphical user interface, comprising:
receiving, using a processor, an indication of an information technology (IT) change request;
performing, using the processor, a first risk classification of the IT change request using a decision tree model;
generating, using the processor, the graphical user interface based on the first risk classification, the graphical user interface indicating risk impacts for each of a plurality of request features;
receiving, in the graphical user interface, a user modification to a first request feature of the plurality of request features; and
in response to the user modification, automatically performing a second request analysis using the decision tree model.

9. The method of claim 8, further comprising:
automatically performing a change to an IT system based on the IT change request, wherein the change is at least one of a hardware modification and a software modification, wherein the change is based on the first request feature.

10. The method of claim 8, further comprising:
automatically updating the graphical user interface based on the second request analysis.

11. The method of claim 8, further comprising:
obtaining historical information from a plurality of change management systems; and
training the decision tree model using the historical information from the plurality of change management systems.

12. The method of claim 11, wherein the graphical user interface simultaneously includes:
a first interface portion including the first risk classification impacts of the plurality of request features;
a second interface portion including a graphic representation of the decision tree model; and
a third interface portion including indications of suggested actions to reduce a risk score of the IT change request.

13. The method of claim 8, further comprising:
performing the first risk classification by traversing the decision tree model, wherein non-leaf nodes of the decision tree model correspond to attribute tests, and wherein leaf nodes of the decision tree model correspond to risk class labels.

14. The method of claim 8, wherein the graphical user interface includes a plurality of selectable controls, each selectable control to modify an associated request feature of the plurality of request features.

15. An article comprising a non-transitory machine-readable storage medium storing instructions that upon execution cause a processor to:
receive an indication of a change request regarding an information technology (IT) system;
perform a first risk classification of the change request using a decision tree model;
generate a graphical user interface based on the first risk classification, the graphical user interface indicating risk impacts for each of a plurality of request features; and
in response to a user modification to at least one request feature of the plurality of request features, automatically perform a second request analysis using the decision tree model.

16. The article of claim 15, the instructions being executable by the processor to:
automatically update the graphical user interface based on the second request analysis.

17. The article of claim 15, the instructions being executable by the processor to:
obtain historical information from a plurality of change management systems; and
perform training using the historical information from the plurality of change management systems to generate the decision tree model.

18. The article of claim 17, wherein the historical information is based on a plurality of completed change requests.

19. The article of claim 18, wherein the training is based at least in part on expert review of the plurality of completed change requests.

20. The article of claim 15, wherein the graphical user interface includes a graphic representation of the decision tree model.

* * * * *